US010342062B2

(12) United States Patent
Serbu

(10) Patent No.: US 10,342,062 B2
(45) Date of Patent: Jul. 2, 2019

(54) TECHNOLOGIES FOR A LOCAL NETWORK POWER MANAGEMENT PROTOCOL

(71) Applicant: Intel IP Corporation, Santa Clara, CA (US)

(72) Inventor: Viorel Serbu, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 253 days.

(21) Appl. No.: 15/392,843

(22) Filed: Dec. 28, 2016

(65) Prior Publication Data

US 2018/0184467 A1 Jun. 28, 2018

(51) Int. Cl.
| | |
|---|---|
| *H04W 4/06* | (2009.01) |
| *H04W 52/02* | (2009.01) |
| *H04W 76/27* | (2018.01) |
| *H04W 76/38* | (2018.01) |

(52) U.S. Cl.
CPC .............. *H04W 76/27* (2018.02); *H04W 4/06* (2013.01); *H04W 52/0229* (2013.01); *H04W 76/38* (2018.02); *Y02D 70/00* (2018.01); *Y02D 70/142* (2018.01); *Y02D 70/144* (2018.01); *Y02D 70/146* (2018.01); *Y02D 70/20* (2018.01); *Y02D 70/26* (2018.01)

(58) Field of Classification Search
CPC ....... H04W 76/27; H04W 76/38; H04W 4/06; H04W 52/0229
See application file for complete search history.

(56) References Cited

U.S. PATENT DOCUMENTS

| 9,241,307 | B2 * | 1/2016 | Merlin .............. H04W 52/0209 |
|---|---|---|---|
| 2011/0072286 | A1 | 3/2011 | Graham |
| 2013/0266024 | A1 | 10/2013 | Schoppmeier |
| 2014/0112224 | A1 | 4/2014 | Jafarian et al. |
| 2016/0026234 | A1 | 1/2016 | Machnicki et al. |
| 2016/0285517 | A1 | 12/2016 | Kakani |

OTHER PUBLICATIONS

International search report for PCT application No. PCT/US2017/063408, dated Mar. 7, 2018 (3 pages).
Written opinion for PCT application No. PCT/US2017/063408, dated Mar. 7, 2018 (5 pages).

* cited by examiner

*Primary Examiner* — Walter J Divito
(74) *Attorney, Agent, or Firm* — Barnes & Thornburg LLP

(57) ABSTRACT

Technologies for local network power management include multiple computing devices in communication over a network. Each computing device may advertise an active-to-network-power-down state in response to determining to trigger a network power down (NPD) state and then determine whether any peer device of the local network rejected or aborted the request. If not, the computing device advertises the NPD state and then determines whether any peer device rejected the request. If not, the computing device enters the NPD state. In the NPD state, the computing device may receive a network power management packet from a peer device. If the network power management packet is a state advertisement, the computing device may update a data table based on the advertised state of the peer device. If the network power management packet is a command, the computing device may wake and return to the active state. Other embodiments are described and claimed.

25 Claims, 8 Drawing Sheets

US 10,342,062 B2

TECHNOLOGIES FOR A LOCAL NETWORK POWER MANAGEMENT PROTOCOL

BACKGROUND

Reducing power consumption is an important objective for modern computing devices. Thus, current computing devices may support multiple device and system power states including various low-power sleep and/or standby states. Computing devices that are connected by a local network (such as an Ethernet network) may each implement an independent power management scheme. Certain network protocols such as Energy-Efficient Ethernet (EEE) address link power states (i.e., physical layer power states) but do not consider device power states.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
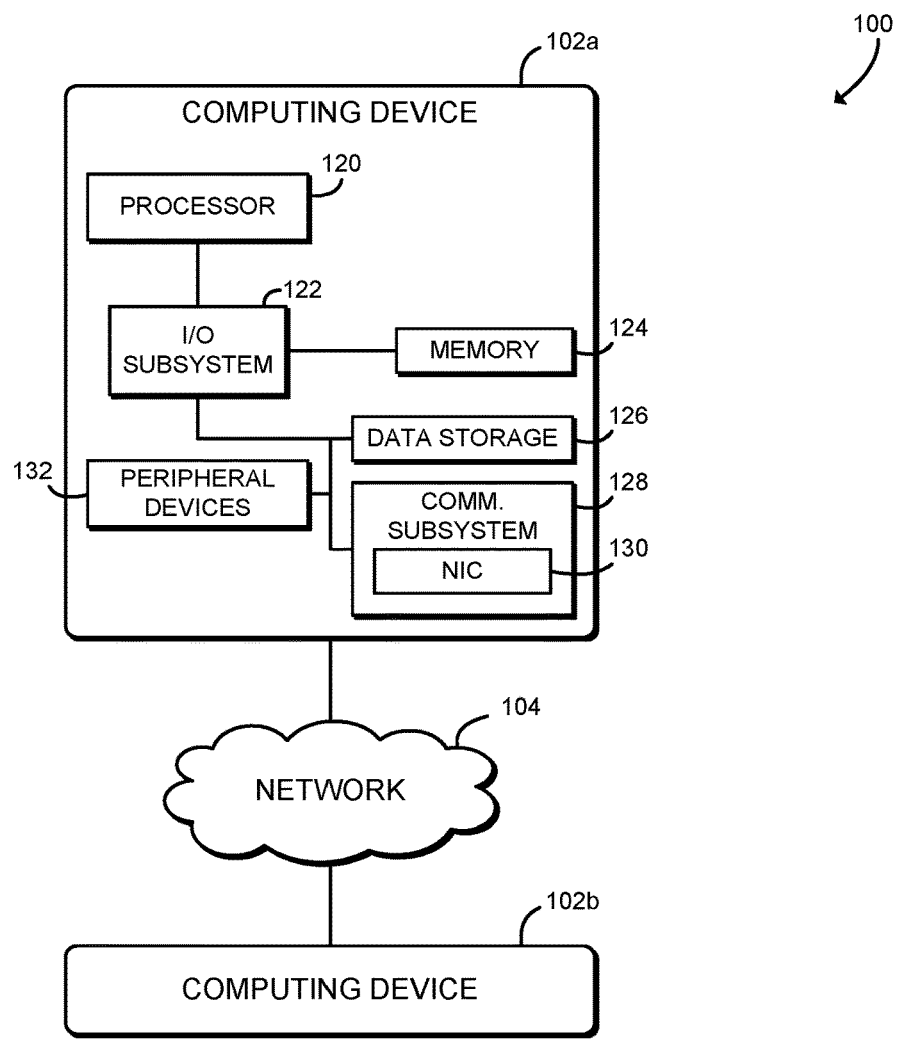
FIG. 1 is a simplified block diagram of at least one embodiment of a system for local network power management.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for local network power management includes multiple computing devices 102 in communication over a network 104. Each computing device 102 is initially in an active (AS) state and may transition to a network power down (NPD) state to save power. After determining to enter the NPD state, a computing device 102 broadcasts an advertisement packet to the other computing devices 102 indicating that it intends to enter the NPD state. The other computing devices 102 may respond with a command packet that rejects the transition to the NPD state. If not rejected or otherwise aborted, the computing device 102 enters the NPD state and may power down its network interface. The advertisement packets and the command packets are wake-up packets that may be processed by the computing devices 102 while in the AS state or the NPD state. After entering the NPD state, a computing device 102 may transition back to the AS state in response to receiving a command packet from another computing device 102. Thus, the system 100 may allow the computing devices 102 to enter a low-power device state in a coordinated fashion, including link power states and device power states. Computing devices 102 are prevented from interpreting powered-down computing devices 102 as deactivated or malfunctioning. Additionally, the system 100 prevents potential race conditions when a computing device 102 powers down and computing device 102 is just about to start communication. Thus, the system 100 may prevent unpredictable delays in data transfer and/or lost transmissions over the network 104, while improving energy efficiency of all computing devices 102 of the system 100.

Each computing device 102 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively include a processor 120, an input/output subsystem 122, a memory 124, a data storage device 126, and a communication subsystem 128, and/or other components and devices commonly found in a notebook computer or similar computing device. Of course, the computing device 102 may include other or additional components, such as those commonly found in a notebook computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102, such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 102 may be embodied as any communication circuit, device, or collection thereof, capable of enabling communications between the computing device 102 and other remote devices over a network. The communication subsystem 128 may be configured to use any one or more communication technology (e.g., wired or wireless communications) and associated protocols (e.g., Ethernet, InfiniBand®, Bluetooth®, Wi-Fi®, WiMAX, etc.) to effect such communication.

The illustrative communications subsystem 128 includes a network interface controller (NIC) 130. The NIC 130 may be embodied as one or more add-in-boards, daughtercards, controller chips, chipsets, circuits, or other devices that may be used by the computing device 102 for network communications with remote devices. For example, the NIC 130 may be embodied as an expansion card coupled to the I/O subsystem 122 over an expansion bus such as PCI Express. As another example, in some embodiments the NIC 130 may be embodied as a network controller integrated with the I/O subsystem 122, the processor 120, an SoC, and/or one or more other components of the computing device 102. The NIC 130 may include Ethernet port logic (e.g., MAC, PHY, and other Ethernet layers and/or components) used to communicate with remote devices. In particular, the NIC 130 may include an Ethernet PHY that supports energy detect on the media interface, and the computing device 102 may be woken up by receiving Ethernet frames with a predetermined wake-up pattern.

As shown, the computing device 102 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

As discussed in more detail below, the computing devices 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), and/or a wired or wireless wide area network (WAN). As such, the network 104 may include any number of additional devices, such as additional computers, routers, and switches, to facilitate communications among the devices of the system 100. In the illustrative embodiment, the network 104 is embodied as a local Ethernet network.

Figure 2:
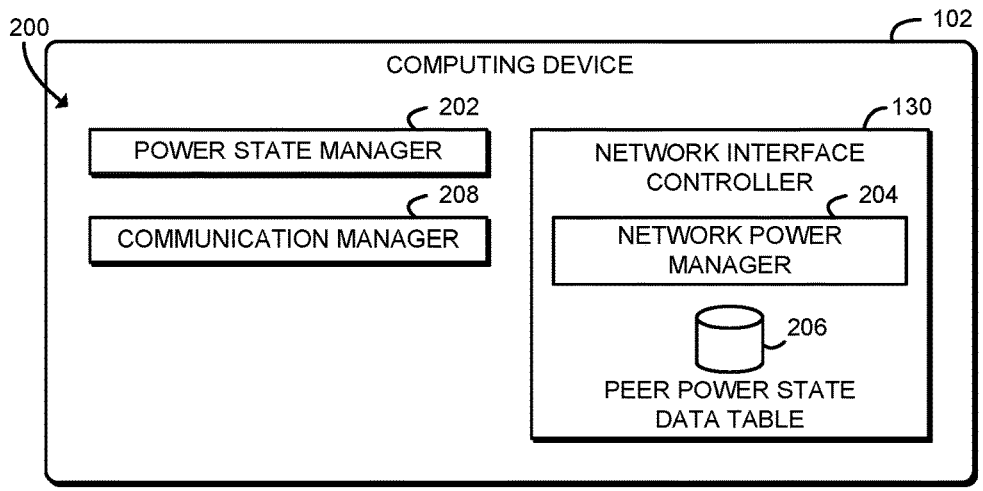
FIG. 2 is a simplified block diagram of at least one embodiment of an environment that may be established by a computing device of FIG. 1.

Referring now to FIG. 2, in an illustrative embodiment, the computing device 102 establishes an environment 200 during operation. The illustrative environment 200 includes a power state manager 202, a network power manager 204, and a communication manager 208. The various components of the environment 200 may be embodied as hardware, firmware, software, or a combination thereof. As such, in some embodiments, one or more of the components of the environment 200 may be embodied as circuitry or collection of electrical devices (e.g., power state manager circuitry 202, network power manager circuitry 204, and/or communication manager circuitry 208). It should be appreciated that, in such embodiments, one or more of the power state manager circuitry 202, the network power manager circuitry 204, and/or the communication manager circuitry 208 may form a portion of one or more of the processor 120, the I/O subsystem 122, the NIC 130, and/or other components of the computing device 102. Additionally, in some embodiments, one or more of the illustrative components may form a portion of another component and/or one or more of the illustrative components may be independent of one another.

The power state manager 202 is configured to determine whether to trigger a network power down state. For example, the power state manager 202 may be configured to set a network inactivity timer that is reset in response to incoming network activity and determine whether the network inactivity has expired. As described further below, after triggering the network power down state, components of the computing device 102 (e.g., the communication subsystem 128 and/or the NIC 130) are allowed to enter a low-power state. Those components may inform the power state manager 202 when they actually enter the low-power state, and the power state manager 202 may track the power states of various components of the computing device 102. The power state manager 202 may also be configured to trigger an active state, for example in response to an outgoing data send request.

The network power manager 204 is configured to advertise an active-to-network-power-down transition state to the local network 104 in response to the power state manager 202 triggering the network power down state. The network power manager 204 is further configured to determine whether any peer computing device 102 of the local network 104 rejected or aborted the network power down state within a predetermined rejection time period after that advertisement. The network power manager 204 is further configured to advertise the network power down state to the local network 104 in response to determining that no peer device rejected or aborted the network power down state, and to determine whether any peer computing device 102 of the local network 104 rejected the network power down state within a predetermined propagation time period after that advertisement.

The network power manager 204 is further configured to enter the network power down state in response to determining that no peer computing device 102 rejected the network power down state. The network power manager 204 may be further configured to operate a network interface of the computing device 102 in a full-power state and then power down the network interface in response determining that no peer computing device 102 rejected the network power down state. The network power manager 204 may be further configured to remain in an active state in response to determining that any peer computing device 102 rejected or aborted the network power down state.

The network power manager 204 may be further configured to advertise an active state to the local network 104 in response to determining that any peer computing device 102 of the local network 104 rejected the network power down state within the predetermined propagation time period. The network power manager 204 is further configured to wait a predetermined residence time period before advertisement of the active state. The predetermined residence time period is a minimum amount of time required to be resident in the network power down state. The power state manager 202 is further configured to remain in the active state in response to waiting the predetermined residence time period.

The network power manager 204 may be further configured to determine whether to enter an active state in response to entering the network power down state. The network power manager 204 is further configured to advertise the active state to the local network 104 in response to determining to enter the active state. The power state manager 202 is further configured to enter the active state in response to advertising the active state.

The peer power state data table 206 includes data associating the AS state or the NPD state with peer computing devices 102 of the local network 104. For example, the peer power state data table 206 may include entries that each associate a power state (e.g., AS or NPD) with a layer 2 Ethernet address (i.e., a MAC address) of a computing device 102. Additionally or alternatively, although illustrated as being established by the NIC 130, it should be understood that in some embodiments some or all of the functions of the network power manager 204 and/or the peer power state data table 206 may be established by other components of the computing device 102, such as the processor 120.

The communication manager 208 is configured to receive, while operating in the active state, an incoming network packet from a source computing device 102 of the local network 104. The communication manager 208 is configured to determine whether the incoming network packet is a network power management packet. As described further below, each network power management packet includes a predetermined protocol type and a predetermined wake-up pattern. The communication manager 208 is further configured to determine whether the network power management packet is an advertisement packet that is indicative of the active-to-network-power-down transition state, and if so, determine whether the computing device 102 is in active communication with the source computing device 102. The communication manager 208 is configured to send a network power down reject command packet to the source computing 102 if the computing device 102 is in active communication with the source computing device 102. The command packet is also a network power management packet. The communication manager 208 may be further configured to determine whether the network power management packet includes an advertisement packet that is indicative of the active state or the network power down state, and, if so, to update the peer power state data table 206 based on the source computing device 102 and the network power state indicated by the advertisement packet.

The communication manager 208 is further configured to determine, while operating in an active state, whether a destination computing device 102 is in the network power down state based on the peer power state data table 206 and, if so, to send a wake-up command packet to the destination computing device 102. The wake-up command packet also a network power management packet. The communication manager 208 is further configured to send a data packet to the destination computing device 102 after sending the wake-up command packet.

Figure 3:
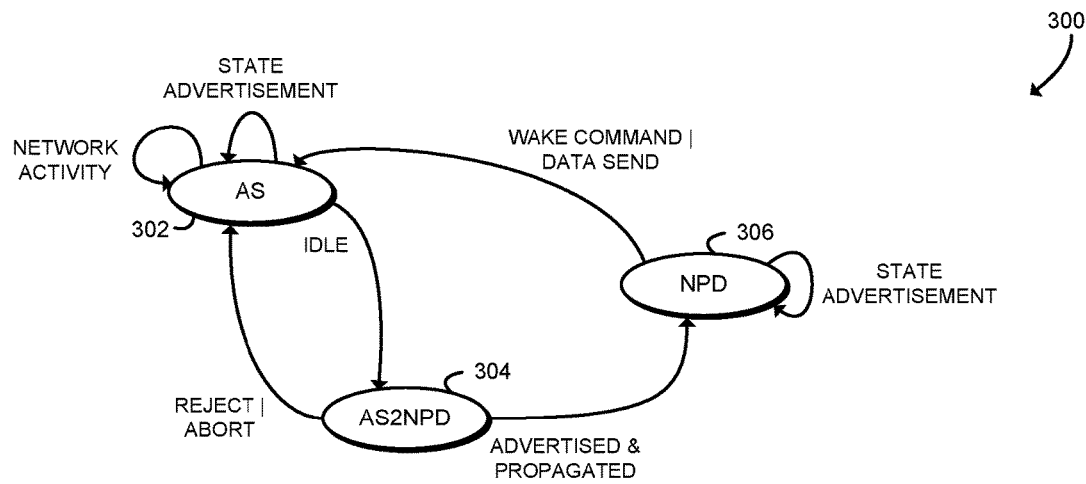
FIG. 3 is a simplified state transition diagram illustrating power states that may be established by the computing device of FIGS. 1-2.

Referring now to FIG. 3, a state transition diagram 300 illustrates various power states and power transition states that may be established by each computing device 102 of the system 100. A method for transitioning between the states that may be executed by the computing device 102 is described further below in connection with FIG. 5. As shown in FIG. 3, the computing device 102 starts in the active (AS) state 302. The computing device 102 may be initialized in the AS state 302 for example when first powered on or when initially connected to the network 104. In the AS state 302, the components of the computing device 102 involved in data communication (including, for example, the communication subsystem 128 and/or the processor 120) are fully powered and active, and there are no additional delays associated with processing incoming network data. As the computing device 102 continues to process network activity (incoming or outgoing), the computing device 102 may remain in the AS state 302. After being idle (i.e., with no outgoing network activity and no expected incoming network activity), the computing device 102 may transition to a transitional AS2NPD state 304.

In the AS2NPD state 304, the computing device 102 advertises that it intends to enter a network power down (NPD) state 306 to other computing devices 102 of the network 104. The computing device 102 advertises by broadcasting a network power management packet over the network 104 that indicates that the computing device 102 is in the AS2NPD state 304. After receiving the advertisement, other computing devices 102 of the network 104 may respond with a network power management packet that rejects the NPD state 306. If the NPD state 306 is rejected, or if the NPD state 306 is aborted in response to receiving a normal data packet (e.g., a packet other than a network power management packet), the computing device 102 transitions back to the AS state 302. If the NPD state 306 is not rejected or aborted, the computing device 102 advertises the NPD state 306 to other computing devices 102 of the network 104. The computing device 102 waits a predetermined amount of time to allow the advertisement to propagate to all computing devices 102 and, if no network power management packet that rejects the NPD state 306 is received, the computing device 102 transitions to the NPD state 306.

In the NPD state 306, components of the computing device 102 involved in data communication (e.g., the communication subsystem 128 and/or the processor 120) may be powered down and inactive. In particular, the computing device 102 may enter a low-power system state such as sleep or standby and/or certain components of the computing device 102 may enter a low-power device state. While in the NPD state 306, the computing device 102 cannot process incoming data packets and must be woken up in order to receive data. However, while in the NPD state 306, the computing device 102 is capable of receiving and processing certain wake-up packets that include a predetermined data pattern, including network power management (NPM) packets. If the computing device 102 receives a NPM packet that includes a wake-up command, the computing device 102 transitions back to the AS state 302. If the computing device 102 receives an NPM packet that includes a state advertisement, the computing device 102 may update its local peer power state data table 206 and remain in the NPD state 306.

Figure 4:
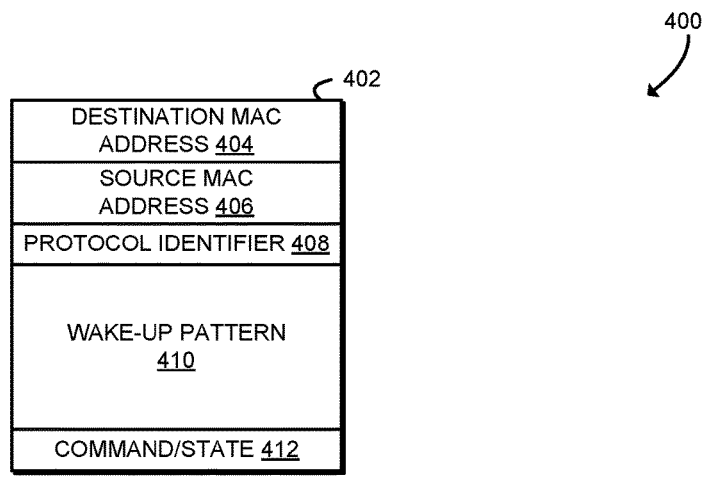
FIG. 4 is a schematic diagram illustrating at least one embodiment of a network power management packet that may be used by the system of FIG. 1.

Referring now to FIG. 4, a schematic diagram 400 illustrates a network power management (NPM) packet 402 that may be processed by the system 100. The NPM packet 402 is illustratively embodied as a layer 2 Ethernet frame that may be transmitted and/or received by the computing device 102. As shown in FIG. 4, the NPM packet 402 starts with a destination MAC address 404. The destination MAC address 404 may identify the particular computing device 102 that is the unicast recipient of an included command, or the destination MAC address 404 may include a broadcast address (e.g., six octets equal to 0xFFFFFFFFFFFF) if the NPM packet 402 is to be broadcast to all computing devices 102 on the network 104. The NPM packet 402 includes a source MAC address 406 that identifies the computing device 102 that originated the NPM packet 402. The NPM packet 402 further includes a protocol identifier 408 that identifies the packet 402 as an NPM packet 402. For example, the protocol identifier 408 may be embodied as the hex value 0x81C0 or any other predetermined value assigned to NPM packets. The NPM packet 402 includes a wake-up pattern 410. The wake-up pattern 410 may be embodied as any predetermined binary pattern included in the payload of the NPM packet 402. Similar to a "magic packet" used by Wake-on-LAN, the communication subsystem 128 of each computing device 102 of the network 104 may filter incoming packets for the wake-up pattern 410 (e.g., by filtering for a predefined offset, content, length, and CRC or other appropriate filter) and then wake the computing device 102 or otherwise process the NPM packet 402, even when in the NPD state. For example, a MAC layer of the NIC 130 may be programmed to filter for the wake-up pattern 410. The NPM packet further includes a command/state 412, which may be embodied as a protocol-specific code that indicates either an advertised power state or a NPM command. The command/state 412 is illustratively embodied as a two-octet field in the NPM packet 402. Table 1, below, lists possible values for the command/state 412.

TABLE 1

Illustrative values for NPM commands and states.

| Command | Value | Comment |
|---------|-------|---------|
| WAKE-UP | 0x0001 | Wake-up command addressed to specific computing device 102 identified by destination MAC address 404 |
| REJECT | 0x0002 | Reject a request to enter NPD, addressed to computing device 102 identified by destination MAC address 404 |

| State | Value | Comment |
|-------|-------|---------|
| AS | 0x8001 | Advertising AS state, sent by computing device 102 identified by source MAC address 406 |
| NPD | 0x8002 | Advertising NPD state, sent by computing device 102 identified by source MAC address 406 |
| AS2NPD | 0x8003 | Advertising intention to enter NPD state, sent by computing device 102 identified by source MAC address 406 |

Figure 5:
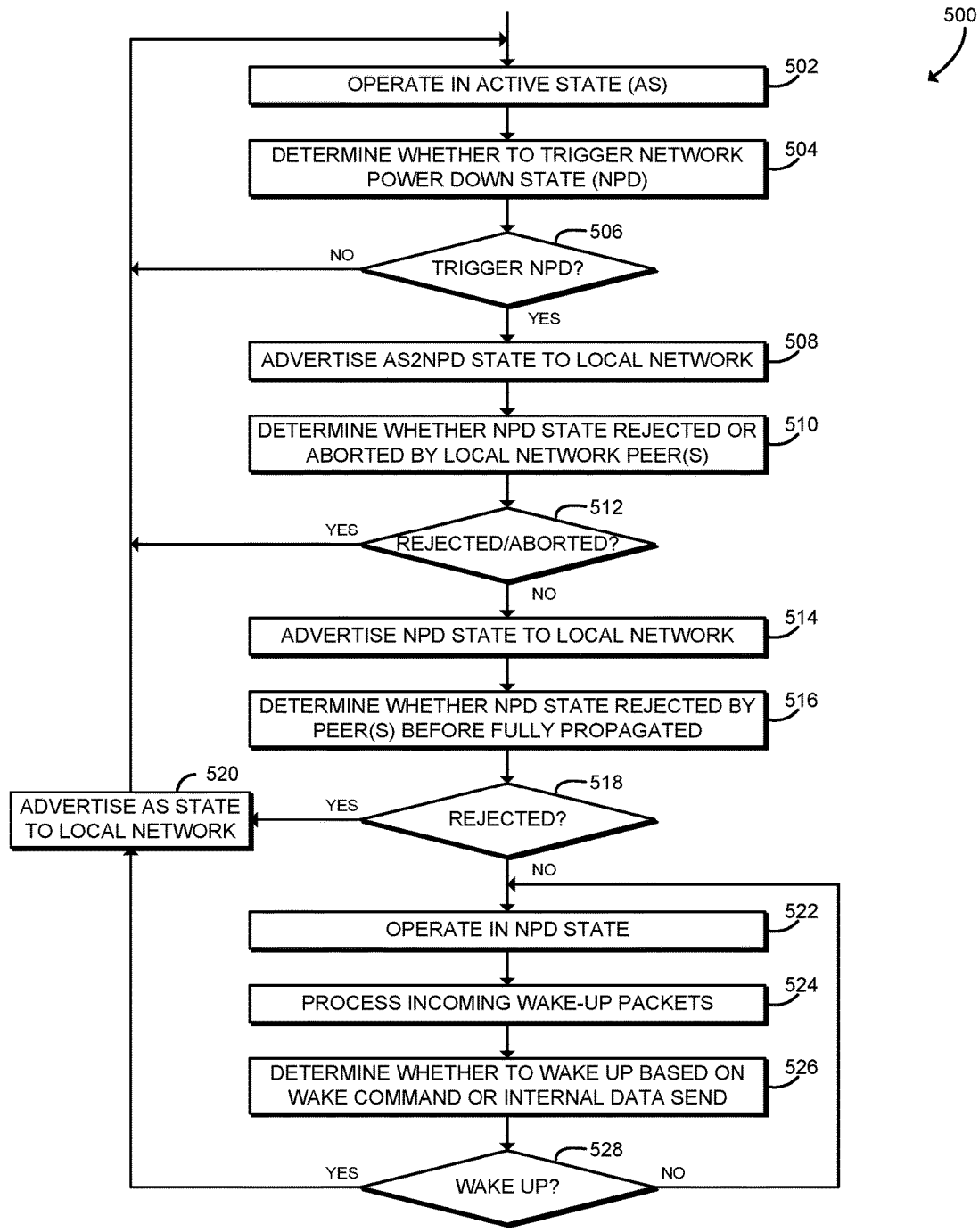
FIG. 5 is a simplified flow diagram of at least one embodiment of a method for local network power management that may be executed by a computing device of FIGS. 1-2.

Referring now to FIG. 5, in use, a computing device 102 may execute a method 500 for local network power management. It should be appreciated that, in some embodiments, the operations of the method 500 may be performed by one or more components of the environment 200 of the computing device 102 as shown in FIG. 2. The method 500 begins in block 502, in which the computing device 102 operates in the active (AS) state. As described above, in the AS state, the components of the computing device 102 involved in data communication (including, for example, the communication subsystem 128 and/or the processor 120) are fully powered and active, and there are no additional delays associated with processing incoming network data. While operating in the AS state, the computing device 102 may process ingoing and outgoing network packets, including network power management (NPM) packets and ordinary data packets. One potential embodiment of a method for processing packets in the AS state is described further below in connection with FIG. 8. The computing device 102 may be initialized in the AS state, for example when first powered on or when initially connected to the network 104. The computing device 102 may advertise the AS state when initially connected to the network 104 by broadcasting an NPM packet that identifies the AS state.

In block 504, the computing device 102 determines whether to trigger the network power down (NPD) state. The computing device 102 may trigger the NPD state when network inactivity is detected or forecasted. For example, as described further below in connection with FIGS. 6A and 6B, the computing device 102 may trigger the NPD after a certain time period of network inactivity has elapsed. In block 506, the computing device 102 checks whether the NPD state should be triggered. If not, the method 500 loops back to block 502 to continue operating in the AS state. If the computing device 102 determines to trigger the NPD state, the method 500 advances to block 508.

In block 508, the computing device 102 advertises the AS2NPD state to the local network 104. To advertise the AS2NPD state, the computing device 102 transmits an NPM packet including a state field value that indicates the AS2NPD state (e.g., 0x8003) to other computing devices 102 on the network 104. The computing device 102 may broadcast the NPM packet to a broadcast address (e.g., destination MAC address 0xFFFFFFFFFFFF).

In block 510, the computing device 102 determines whether the transition to the NPD state is rejected or aborted by any local network peers (i.e., other computing devices 102 of the network 104). As described further below, other computing devices 102 may reject the transition to the NPD state by sending an NPM packet to the computing device 102 that includes a command field value that indicates the REJECT command (e.g., 0x0002). The transition to the NPD state may also be aborted if the computing device 102 receives one or more ordinary data packets (e.g., network packets that are not NPM packets), which indicate that the computing device 102 is in active communication over the network 104. In block 512, the computing device 102 checks whether the transition to the NPD state is rejected or aborted. If so, the method 500 loops back to block 502 to continue operating in the AS state. If the transition to the NPD state is not rejected or aborted, the method 500 advances to block 514.

In block 514, the computing device 102 advertises the NPD state to the local network 104. To advertise the NPD state, the computing device 102 transmits an NPM packet including a state field value that indicates the NPD state (e.g., 0x8002) to other computing devices 102 on the network 104. The computing device 102 may broadcast the NPM packet to a broadcast address (e.g., destination MAC address 0xFFFFFFFFFFFF).

In block 516, the computing device 102 determines whether the transition to the NPD state is rejected by any local network peers (i.e., other computing devices 102 of the network 104) before the advertisement has fully propagated over the network 104. As described above, other computing devices 102 may reject the transition to the NPD state by sending an NPM packet including a REJECT command to the computing device 102. The computing device 102 may monitor for REJECT command NPM packets in case a peer computing device 102 transmitted the REJECT command NPM packet after the computing device 102 advertised the NPD state but before the peer computing device 102 received and/or processed the advertisement.

In block 518, the computing device 102 checks whether the transition to the NPD state is rejected. If so, the method 500 branches to block 520, in which the computing device 102 advertises the AS state to the local network 104. To advertise the AS state, the computing device 102 transmits an NPM packet including a state field value that indicates the AS state (e.g., 0x8001) to other computing devices 102 on the network 104. The computing device 102 may broadcast the NPM packet to a broadcast address (e.g., destination MAC address 0xFFFFFFFFFFFF). After advertising the AS state, the method 500 loops back to block 502 to continue operating in the AS state. Referring back to block 518, if the transition to the NPD state is not rejected, the method 500 advances to block 522.

In block 522, the computing device 102 operates in the NPD state. As described above, in the NPD state, components of the computing device 102 involved in data communication may be powered down and inactive. In particular, the computing device 102 may power down components of the communication subsystem 128 and/or NIC 130, such as the MAC, PHY, physical link, or other sub-component of the communication subsystem 128. Independently, the computing device 102 may also enter a low-power system state such as sleep or standby, allowing components such as the processor 120, I/O subsystem 122, memory 124, and/or data storage device 126 to enter low-power states. Additionally or alternatively, the computing device 102 may remain in an active state, for example to allow the user to perform offline tasks that do not require network access.

In block 524, the computing device 102 processes incoming wake-up packets. Wake-up packets, such as NPM packets, include a predetermined data pattern that may be identified by the communication subsystem 128. For example, the communication subsystem 128 of the computing device 102 may filter incoming packets for the wake-up pattern, for example by filtering packets for a predefined offset, content, length, and CRC. In response to detecting a wake-up packet, the computing device 102 may process the wake-up packet without initially waking the entire communication subsystem 128 and/or computing device 102, for example by processing the wake-up packet using the NIC 130.

In block 526, the computing device 102 determines whether to wake the communication subsystem 128. For example, the NIC 130 may determine to wake the communication subsystem 128 if an NPM packet including a WAKE-UP command has been received. As another example, the communication subsystem 128 may wake up in order to send outgoing network data. One potential embodiment of a method for processing wake-up packets and determining whether to wake the communication subsystem 128 is described further below in connection with FIG. 7. In block 528, the computing device 102 checks whether to wake the communication subsystem 128. If so, the method 500 loops back to block 520, in which the computing device 102 advertises the AS state and then operates in the AS state. If the computing device 102 determines not to wake, the method 500 loops back to block 522, in which the computing device 102 continues to operate in the NPD state.

Figure 6A:
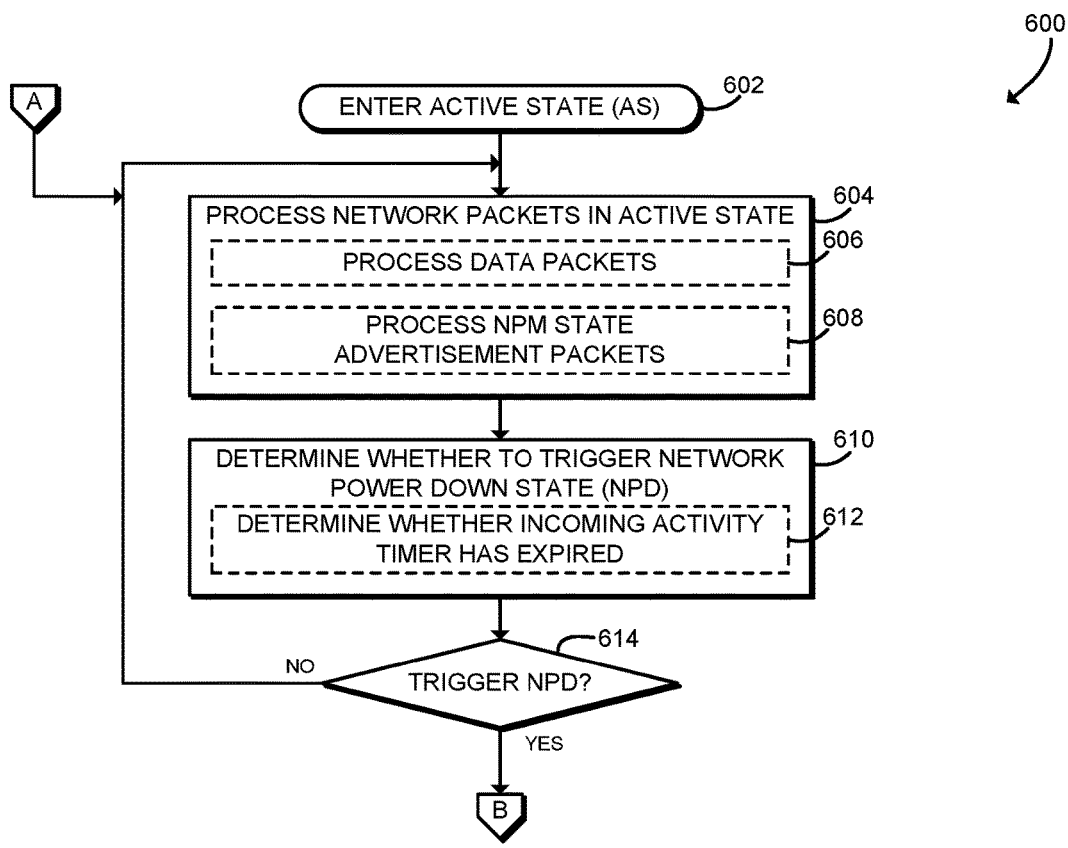
FIGS. 6A and 6B are a simplified flow diagram of at least one embodiment of a method for transitioning from an active state to a network power down state that may be executed by a computing device of FIGS. 1-2.
Figure 6B:
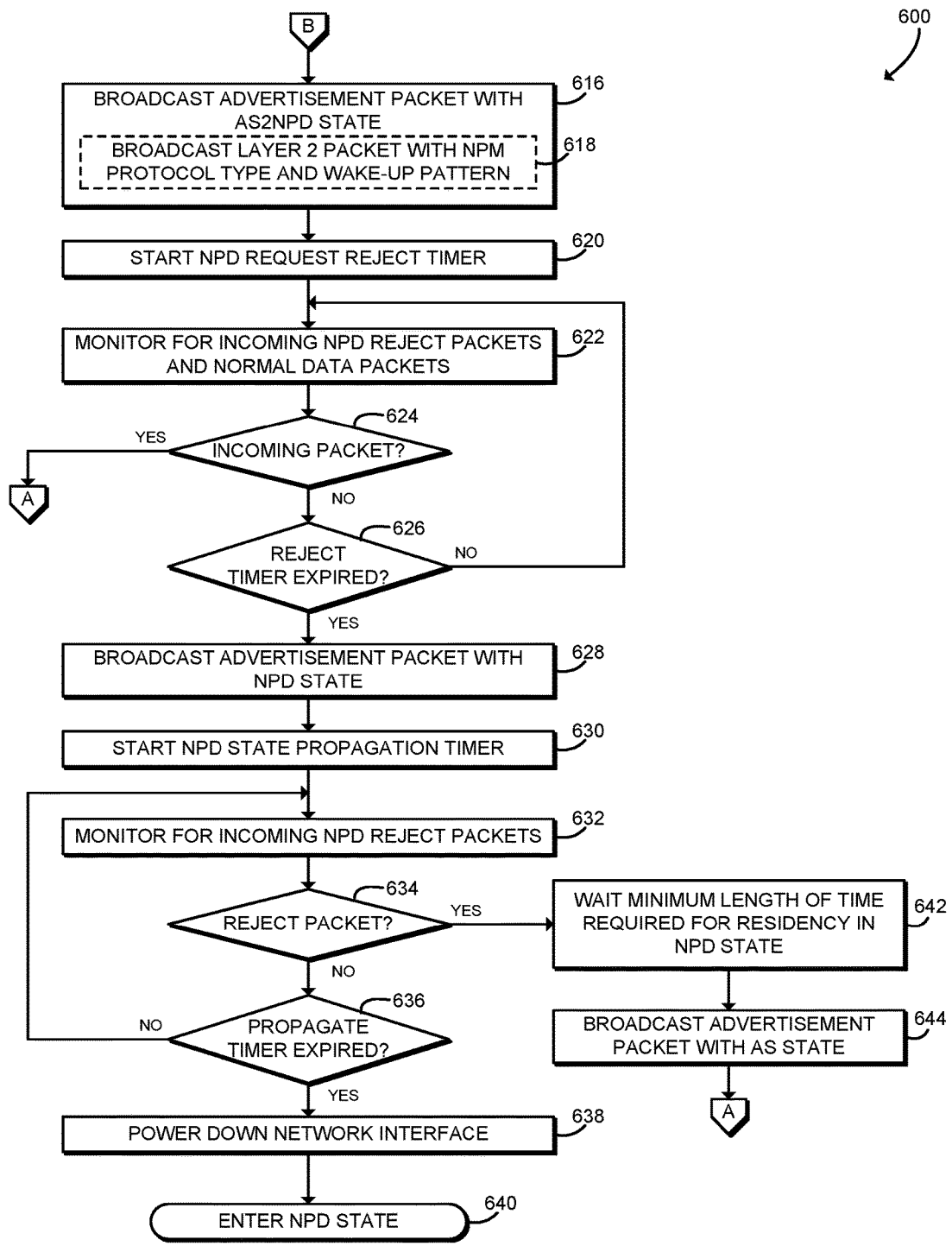

Referring now to FIGS. 6A and 6B, in use, a computing device 102 may execute a method 600 for transitioning from the active state to the network power down state. It should be appreciated that, in some embodiments, the operations of the method 600 may be performed by one or more components of the environment 200 of the computing device 102 as shown in FIG. 2. In particular, in some embodiments the functions of the method 600 shown in FIG. 6A may be performed by software executed by the processor 120 of the computing device 102, and the operations of the method 600 shown in FIG. 6B may be performed by the NIC 130. The method 600 begins in block 602, in which the computing device 102 enters the active (AS) state. As described above, the computing device 102 may be initialized in the AS state, for example when first powered on or when initially connected to the network 104. Additionally, as described further below in connection with FIG. 7, the computing device 102 may transition from the NPD state to the AS state in response to receiving an NPM packet including a WAKE-UP command or in response to an internal data send request.

In block 604, the computing device 102 processes network packets while operating in the AS state. In block 606, the computing device 102 may process incoming and/or outgoing data packets. For example, the computing device 102 may process the network packets using a software networking stack executed by the processor 120, including various operating systems, drivers, libraries, and/or applications. In block 608, the computing device 102 may process incoming NPM packets that include state advertisements. In particular, the computing device 102 may update the local peer power state data table 206 to reflect the state of various remote computing devices 102 based on incoming NPM packets. The NPM packets including the state advertisements may be processed by the NIC 130 and/or by the processor 120. One potential embodiment of a method for processing network packets in the AS state is described further below in connection with FIG. 8.

In block 610, the computing device 102 determines whether to trigger the network power down (NPD) state. For example, a power state manager software process executed by the processor 120 of the computing device 102 may determine whether to trigger the NPD state. As described above, the computing device 102 may trigger the NPD when network inactivity is detected or forecasted. In some embodiments, in block 612 the computing device 102 may determine whether an incoming activity timer has expired. The incoming activity timer may be configured to expire after a predetermined amount of time in which no incoming network activity has been received. In block 614, the computing device 102 checks whether the NPD state should be triggered. If not, the method 600 loops back to block 604 and the computing device 102 continues to process packets in the AS state. If the computing device 102 determines to trigger the NPD state, the method 600 advances to block 616, shown in FIG. 6B.

In block 616, shown in FIG. 6B, the computing device 102 broadcasts an NPM advertisement packet with the AS2NPD state. In some embodiments, in block 618 the computing device 102 broadcasts a layer 2 Ethernet packet that includes a state field value that indicates the AS2NPD transitional state (e.g., 0x8003). The broadcast packet may be addressed to a broadcast address of the network 104, such as the destination MAC address 0xFFFFFFFFFFFF. As described above, the NPM advertisement packet also includes the predetermined NPM protocol type (e.g., the value 0x81C0) and the predetermined wake-up pattern. Because the NPM advertisement packet includes the wake-up pattern, the NPM advertisement packet may be received and processed by other computing devices 102 while operating in the AS state or the NPD state.

In block 620, the computing device 102 starts an NPD request reject timer. The NPD request reject timer expires after a predetermined amount of time. As described further below, other computing devices 102 may receive the advertisement packet and determine whether to reject the NPD request within that predetermined amount of time. In block 622, the computing device 102 monitors for incoming NPM packets including a REJECT command and for incoming ordinary data packets (e.g., network packets other than NPM packets). In block 624, the computing device 102 determines whether an incoming packet (e.g., an NPM packet including the REJECT command or an ordinary data packet) has been received. If so, then the request to enter the NPD state has been rejected or aborted and the method 600 loops back to block 604, shown in FIG. 6A, to continue processing packets in the AS state. If no incoming NPM REJECT packet or ordinary data packet has been received, the method 600 advances to block 626, in which the computing device 102 determines whether the NPD request reject timer has expired. If the computing device 102 receives an NPM advertisement packet, the computing device 102 may also update the peer power state data table 206 accordingly. If the NPD request reject timer has not expired, the method 600 loops back to block 622 to continue monitoring for incoming data packets. By monitoring for incoming ordinary data packets while waiting for the request reject timer to expire, the computing device 102 may avoid a potential race condition that could occur if a remote computing device 102 sends an ordinary data packet at the same time that the computing device 102 advertises the AS2NPD state. If the NPD request reject timer has expired, the method 600 advances to block 628.

In block 628, the computing device 102 broadcasts an NPM advertisement packet that includes the NPD state. As described above, the computing device 102 may broadcast a layer 2 Ethernet packet that includes a state field value that indicates the NPD state (e.g., 0x8002). The broadcast packet may be addressed to a broadcast address of the network 104, such as the destination MAC address 0xFFFFFFFFFFFF. As described above, the advertisement packet also includes the predetermined NPM protocol type (e.g., the value 0x81C0) and the predetermined wake-up pattern. Because the NPM advertisement packet includes the wake-up pattern, the NPM advertisement packet may be received and processed by other computing devices 102 while in the AS state or the NPD state.

In block 630, the computing device 102 starts an NPD propagation timer. The NPD propagation timer expires after a predetermined amount of time corresponding to the amount of time needed for the NPD advertisement to propagate across the network 104. In block 632, the computing device 102 monitors for incoming REJECT command NPM packets. Unlike after advertising the AS2NPD state, after advertising the NPD state the computing device 102 does not monitor for ordinary data packets. Thus, by waiting for the NPD advertisement to propagate across the network 104, the computing device 102 may avoid a potential race condition that could occur if a remote computing device 102 sends an NPM packet including the REJECT command at the same time that the computing device 102 advertises the NPD state.

In block 634, the computing device 102 determines whether an NPM packet including the REJECT command has been received. If not, the method 636 advances to block 636, in which the computing device 102 determines whether the NPD propagation timer has expired. If not, the method 600 loops back to block 632 to continue to monitor for NPM packets including the REJECT command. If the NPD propagation timer has expired, the method 600 advances to block 638.

In block 638, the computing device 102 powers down the network interface to the network 104. The computing device 102 may, for example, power down one or more of the MAC, PHY, physical link, or other sub-component of the communication subsystem 128. While in the powered down state, the computing device 102 retains the ability to monitor for wake-up packets such as NPM packets that include a predefined wake-up pattern, similar to a Wake-on-LAN "magic packet." The computing device 102 may also notify software executed by the processor 120 that the network interface has been powered down. In block 640, the computing device 102 enters the NPD state and the method 600 is completed. While operating in the NPD state, components of the computing device 102 involved in data communication (e.g., the communication subsystem 128) may be powered down and inactive. While in the NPD state, the computing device 102 may continue to monitor for incoming wake-up packets such as NPM packets, as described below in connection with FIG. 7.

Referring back to block 634, if an NPM packet including the REJECT command was received before the NPD propagation timer expired, the method 600 branches to block 642. In block 642, the computing device 102 waits a minimum amount of time that is required for residency in the NPD state. The minimum residency time may correspond to the amount of time required to power down and then power on the network interface of the computing device 102. The computing device 102 may not actually enter the NPD state or power down the network interface. In block 644, after waiting for the minimum residency time, the computing device 102 broadcasts an NPM advertisement packet that includes the AS state. As described above, the computing device 102 may broadcast a layer 2 Ethernet packet that includes a state field value that indicates the AS state (e.g., 0x8001). The broadcast packet may be addressed to a broadcast address of the network 104, such as the destination MAC address 0xFFFFFFFFFFFF. As described above, the advertisement packet also includes the predetermined NPM protocol type (e.g., the value 0x81C0) and the predetermined wake-up pattern. Because the NPM advertisement packet includes the wake-up pattern, the NPM advertisement packet may be received and processed by other computing devices 102 while in the AS state or the NPD state. After broadcasting the advertisement packet, the method 600 loops back to block 604, shown in FIG. 6A, to continue operating in the AS state.

Figure 7:
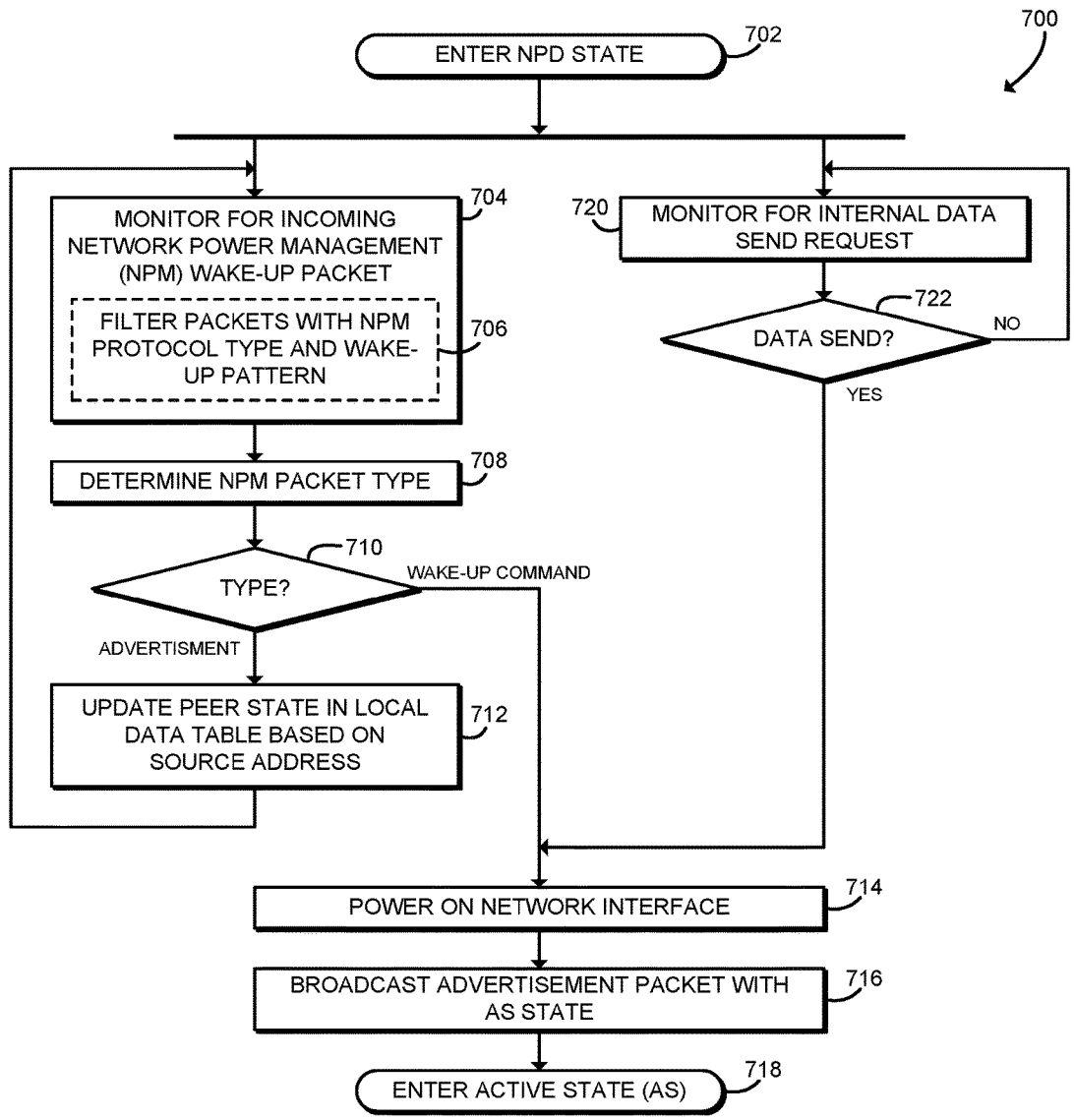
FIG. 7 is a simplified flow diagram of at least one embodiment of a method for transitioning from the network power down state to the active state that may be executed by a computing device of FIGS. 1-2.

Referring now to FIG. 7, in use, a computing device 102 may execute a method 700 for transitioning from the network power down state to the active state. It should be appreciated that, in some embodiments, the operations of the method 700 may be performed by one or more components of the environment 200 of the computing device 102 as shown in FIG. 2. In particular, part or all of the method 700 may be performed by the NIC 130. The method 700 begins in block 702, in which the computing device 102 enters the NPD state. As described above in connection with FIGS. 6A and 6B, the computing device 102 may enter the NPD state after a certain period of network inactivity and after advertising the AS2NPD state and the NPD state to other computing devices 102 of the network 104. After entering the NPD state, the method 700 advances concurrently to blocks 704, 720 to monitor for incoming NPM wake-up packets and to monitor for internal outgoing data send requests, respectively.

In block 704, while in the NPD state, the computing device 102 monitors for incoming network power management (NPM) wake-up packets. As described above, the NPM wake-up packets may be embodied as layer 2 Ethernet packets that include a predetermined protocol type (e.g., 0x81C0) and a predetermined wake-up pattern. Each incoming NPM packet may include a command or an advertised state. In block 706, the computing device 102 may filter incoming packets for the predetermined wake-up pattern. For example, the NIC 130 may be configured to filter incoming packets for a predetermined offset, content, length, and CRC, or with any other appropriate filter. After receiving an incoming NPM wake-up packet, the method 700 advances to block 708.

In block 708, the computing device 102 determines the NPM packet type of the incoming NPM packet. The computing device 102 may determine the NPM packet type by examining a command/state field of the NPM packet. In particular, the computing device 102 may determine whether the incoming NPM packet is a state advertisement packet or a WAKE-UP command packet. In block 710, the computing device 102 branches based on the determined NPM packet type. If the NPM packet is a WAKE-UP command, the method 700 branches to block 714, described below. If the NPM packet is an advertisement packet, the method 700 advances to block 712.

In block 712, the computing device 102 updates the local peer power state data table 206 based on the incoming NPM advertisement packet. In particular, the computing device 102 may update an entry corresponding to the computing device 102 identified by the source MAC address of the NPM advertisement packet with the power state included in the NPM advertisement packet. The computing device 102 may only update the peer power state data table 206 when the advertised state is the AS state or the NPD state (i.e., the computing device 102 may not record advertisements of the AS2NPD transitional state). After updating the peer power state data table 206, the method 700 loops back to block 704 to continue monitoring for incoming NPM wake-up packets. The computing device 102 does not transition to the AS state.

Referring back to block 710, if the NPM packet is a WAKE-UP command packet, the method 700 branches to block 714, in which the computing device 102 powers on the network interface to the network 104. The computing device 102 may, for example, power on one or more of the MAC, PHY, physical link layer, or other sub-component of the communication subsystem 128. After being powered on, the computing device 102 is fully capable of communicating with other computing devices 102 over the network 104.

In block 716, the computing device 102 broadcasts an NPM advertisement packet that includes the AS state. As described above, the computing device 102 may broadcast a layer 2 Ethernet packet that includes a state field value that indicates the AS state (e.g., 0x8001). The broadcast packet may be addressed to a broadcast address of the network 104, such as the destination MAC address 0xFFFFFFFFFFFF. As described above, the advertisement packet also includes the predetermined NPM protocol type (e.g., the value 0x81C0) and the predetermined wake-up pattern. Because the NPM advertisement packet includes the wake-up pattern, the NPM advertisement packet may be received and processed by other computing devices 102 while in the AS state or the NPD state. After advertising the AS state, in block 718 the computing device 102 enters the AS state and the method 700 is completed. While in the AS state, the computing device 102 is fully powered and thus capable of sending, receiving, and otherwise processing network packets. While in the AS state, the computing device 102 may transition back to the NPD state as described above in connection with FIGS. 6A and 6B.

Referring back to block 702, after entering the NPD state the method 700 advances concurrently to blocks 704, 720. In block 720, the computing device 102 monitors for an internal data send request. The data send request may be generated by any hardware, firmware, software, or other entity of the computing device 102 that requests to send data over the network 104. For example, an application or other internal process of the computing device 102 may attempt to transmit data to another computing device 102 of the network 104. In block 722, the computing device 102 checks whether an internal data send request has been received. If not, the method 700 loops back to block 720 to continue monitoring for outgoing send requests. If an internal data send request has been received, the method 700 branches to block 714, in which the computing device 102 powers on the network interface, transitions back to the AS state, and processes the data send request as described above.

Referring now to FIG. 8, in use, a computing device 102 may execute a method 800 for processing network packets. It should be appreciated that, in some embodiments, the operations of the method 800 may be performed by one or more components of the environment 200 of the computing device 102 as shown in FIG. 2. For example, in some embodiments, various operations of the method 800 may be performed by software executed by the processor 120 and/or by the NIC 130. The method 800 begins in block 802, in which the computing device 102

In block 802, the computing device 102 determines whether an incoming network packet has been received. If not, the method 800 branches ahead to block 820, shown in FIG. 8B and described below. If an incoming packet has been received, the method 800 branches ahead to block 804, the computing device 102 determines whether the incoming packet is an NPM packet that is an AS2NPD state advertisement packet. The computing device 102 may determine, for example, whether a command/state field of the packet includes a predetermined value that indicates the AS2NPD state (e.g., 0x8003). If the incoming packet is not an AS2NPD state advertisement packet, the method 800 branches ahead to block 812, described below. If the incoming packet is an AS2NPD state advertisement packet, the method 800 advances to block 806.

In block 806, the computing device 102 determines whether the computing device 102 is in communication with the source computing device 102 identified by the AS2NPD state advertisement packet (e.g., identified by the source MAC address of the packet). The computing device 102 may use any technique to determine whether the computing devices 102 are in communication. The computing device 102 may determine whether, for example, an active communication session or channel exists between the computing devices 102, whether the computing devices 102 have recently communicated, or whether the computing devices 102 are predicted to communicate in the future. In block 808, the computing device 102 checks whether the computing device 102 and the source computing device 102 are in communication. If not in communication, the method 800 branches ahead to block 820, shown in FIG. 8B and described below. If the computing devices 102 are in communication, the method 800 advances to block 810.

In block 810, the computing device 102 sends an NPM packet including the REJECT command to the source computing device 102 of the AS2NPD state advertisement packet. The REJECT command packet may, for example, include the address of the source computing device 102 as the destination MAC address. The REJECT command packet may also include a command field value that indicates the REJECT command (e.g., 0x0002), as well as the predetermined NPM protocol type (e.g., the value 0x81C0) and the predetermined wake-up pattern. As described above in connection with FIGS. 6A and 6B, in response to sending the REJECT command packet, the source computing device 102 will not enter the NPD state. After sending the REJECT command packet, the method 800 advances to block 820, shown in FIG. 8B and described below.

Referring back to block 804, if the incoming packet is not an NPM AS2NPD state advertisement packet, the method 800 branches to block 812, in which the computing device 102 determines whether the incoming packet is any other NPM packet. The computing device 102 may determine, for example, whether the incoming packet includes a predetermined protocol type for NPM packets (e.g., 0x81C0) and/or a predetermined wake-up pattern for NPM packets. If the incoming packet is not an NPM packet, the method 800 branches ahead to block 818, described further below. If the incoming packet is an NPM packet, the method 800 advances to block 814.

In block 814, the computing device 102 updates the local peer power state data table 206 based on the incoming NPM packet. In particular, the computing device 102 may update an entry corresponding to the computing device 102 identified by the source MAC address of the advertisement packet with the advertised state of the advertisement packet. Because AS2NPD state advertisement packets are processed separately as described above, the computing device 102 may only update the peer power state data table 206 when the advertised state is the AS state or the NPD state. Additionally, because the computing device 102 is operating in the AS state, it is not expected to receive NPM command packets (e.g., REJECT or WAKE-UP command packets). In some embodiments, in block 816 the computing device 102 may clear a PENDING FOR AS state in the local peer power state data table 206 if an AS state advertisement packet is received. As described further below, the PENDING FOR AS state may be embodied as a complementary state associated with NPD state in the local peer power state data table 206. After updating the peer power state data table 206, the method 800 advances to block 820, shown in FIG. 8B and described below.

Referring back to block 812, if the incoming packet is not an NPM packet, the method 800 branches to block 818, in which the computing device 102 processes an incoming data packet (e.g., a network packet other than an NPM packet). For example, the computing device 102 may process the network packet using a software networking stack executed by the processor 120, including various operating systems, drivers, libraries, and/or applications. After processing the incoming data packet, the method 800 advances to block 820, shown in FIG. 8B.

Figure 8A:
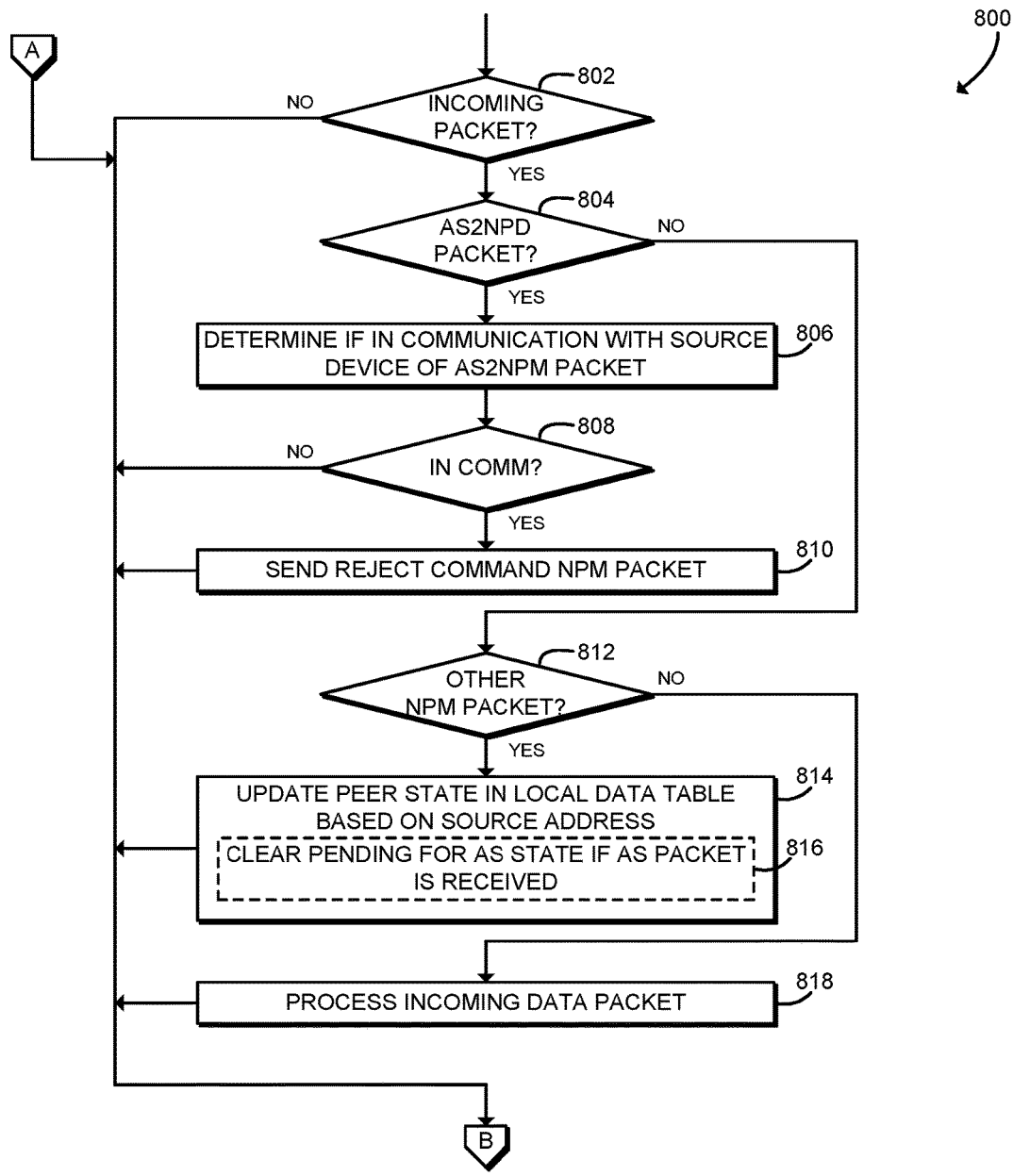
FIGS. 8A and 8B are a simplified flow diagram of at least one embodiment of a method for processing network packets that may be executed by a computing device of FIGS. 1-2.
Figure 8B:
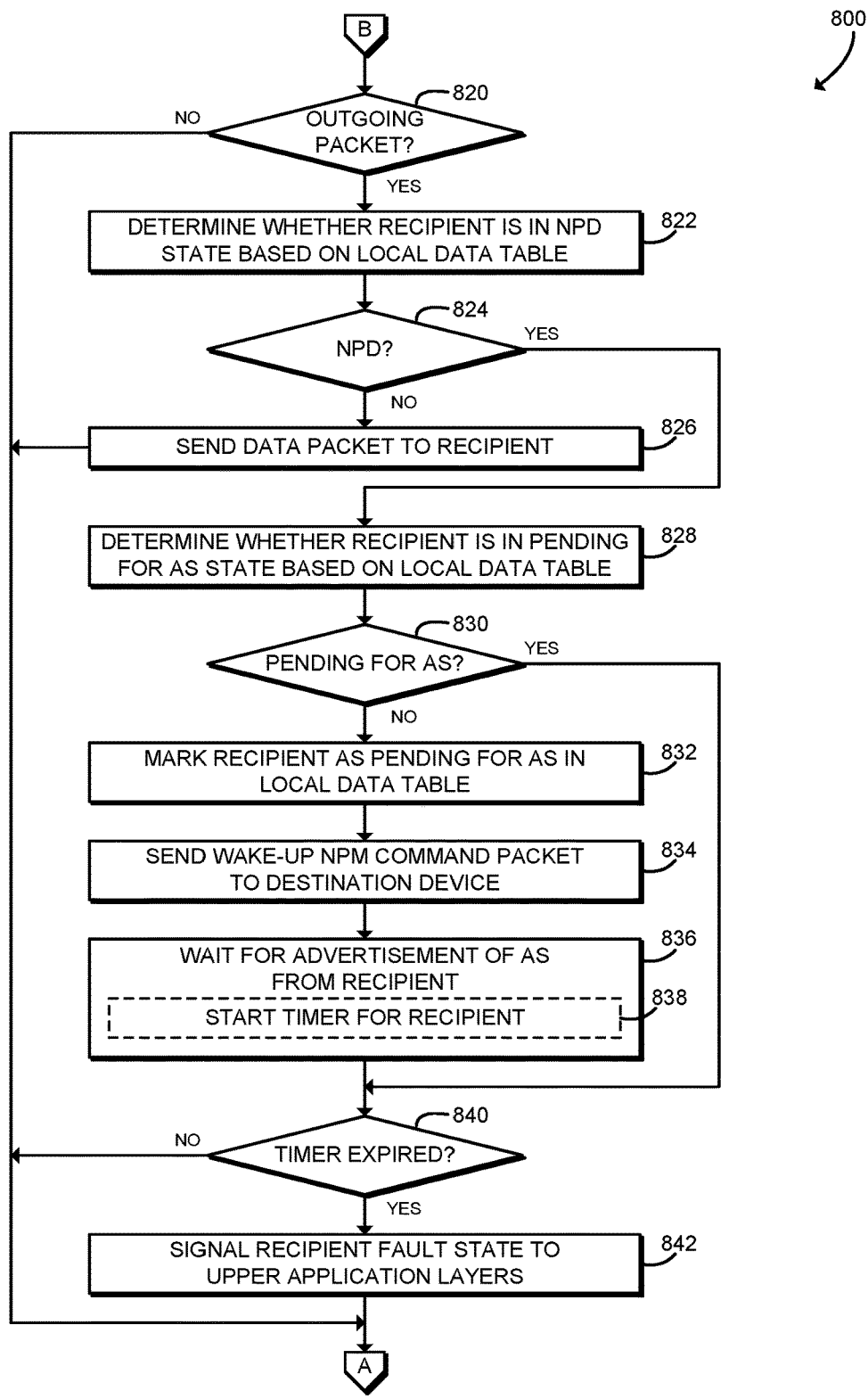

In block 820, shown in FIG. 8B, the computing device 102 determines whether an outgoing data packet exists for transmission to a destination computing device 102. The outgoing data packet may be generated by any hardware, firmware, software, or other entity of the computing device 102 that requests to send data over the network 104. If no outgoing data packet exists, the method 800 loops back to block 802, shown in FIG. 8A, to continue monitoring for incoming packets. If an outgoing data packet exists, the method 800 advances to block 822.

In block 822, the computing device 102 determines whether the destination computing device 102 for the outgoing data packet is in the NPD state based on the peer power state data table 206. For example, the computing device 102 may look up an entry in the peer power state data table 206 based on the MAC address of the destination computing device 102. In block 824, the computing device 102 checks whether the destination computing device 102 is in the NPD state. If so, the method 800 branches to block 828, described below. If the destination computing device 102 is not in the NPD state (i.e., it is in the AS state), the method 800 advances to block 826, in which the computing device 102 sends the outgoing data packet over the network 104 to the destination computing device 102. After sending the outgoing data packet, the method 800 loops back to block 802, shown in FIG. 8A, to continue monitoring for incoming data packets.

Referring back to block 824, if the destination computing device 102 is in the NPD state, the method 800 branches to block 828, in which the computing device 102 determines whether the destination computing device 102 is in the PENDING FOR AS state based on the peer power state data table 206. The PENDING FOR AS state is a complementary state associated with the NPD state in the local peer power state data table 206. The PENDING FOR AS state may be embodied as a bit or other Boolean value. The PENDING FOR AS state may be cleared by the computing device 102 in response to receiving an AS state advertisement packet, as described above. In block 830, the computing device 102 checks whether the destination computing device 102 is in the PENDING FOR AS state. If so, the method 800 branches to block 840, described below. If the destination computing device 102 is not in the PENDING FOR AS state, the method 800 advances to block 832.

In block 832, the computing device 102 marks the destination computing device 102 as being in the PENDING FOR AS state in the peer power state data table 206. The computing device 102 may, for example, set a bit or otherwise flag that the destination computing device 102 is in the PENDING FOR AS state. Note that because the PENDING FOR AS state is a complementary state, the destination computing device 102 remains in the NPD state in the peer power state data table 206.

In block 834, the computing device 102 sends an NPM packet including the WAKE-UP command to the destination computing device 102. The WAKE-UP command packet may, for example, include the address of the destination computing device 102 as the destination MAC address. The WAKE-UP command packet may also include a command field value that indicates the WAKE-UP command (e.g., 0x0001), as well as the predetermined NPM protocol type (e.g., the value 0x81C0) and the predetermined wake-up pattern. After sending the WAKE-UP command packet, in block 836 the computing device 102 waits for advertisement of the AS state from the destination computing device 102. As described above in connection with FIG. 7, in response to receiving the WAKE-UP command packet, the destination computing device 102 will transition from the NPD state to the AS state and advertise the AS state. In some embodiments, in block 838 the computing device 102 may start an AS advertisement timer for the destination computing device 102.

In block 840, the computing device 102 checks whether the AS advertisement timer for the destination computing device 102 has expired. If the timer has not expired, the method 800 loops back to block 802, shown in FIG. 8A, to continue processing network traffic. As described above, while the timer is running and has not expired, the computing device 102 may receive an AS state advertisement packet from the destination computing device 102 and update the state of the destination computing device 102 in the peer power state data table 206. Thus, the computing device 102 may continue to check whether the destination computing device 102 is in the PENDING FOR AS state until an AS state advertisement has been received. After the AS state advertisement is received, the destination computing device 102 is in the AS state in the peer power state data table 206 and the PENDING FOR AS state is cleared; therefore, the computing device 102 may then may send the outgoing data packet to the destination computing device 102.

Referring back to block 840, if the AS advertisement timer for the destination computing device 102 has expired, the method 800 advances to block 842. In this circumstance, the destination computing device 102 has been sent a WAKE-UP command packet but has not responded with an AS state advertisement packet. Thus, in block 842, the computing device 102 may signal a fault state of the destination computing device 102 to one or more upper application layers. The fault state may indicate that the destination computing device 102 has been disconnected from the network, that the network connection has failed, that the destination computing device 102 has experienced a power failure, or other error condition. The upper application layers may take appropriate action in response to the fault condition, for example taking action to avoid data loss.

After signaling the fault state, the method 800 loops back to block 802, shown in FIG. 8A, to continue processing network traffic.

It should be appreciated that, in some embodiments, the methods 500, 600, 700, and/or 800 may be embodied as various instructions stored on a computer-readable media, which may be executed by the processor 120, the I/O subsystem 122, the NIC 130, and/or other components of a computing device 102 to cause the computing device 102 to perform the respective method 500, 600, 700, and/or 800. The computer-readable media may be embodied as any type of media capable of being read by the computing device 102 including, but not limited to, the memory 124, the data storage device 126, firmware devices, and/or other media.

EXAMPLES

Illustrative examples of the technologies disclosed herein are provided below. An embodiment of the technologies may include any one or more, and any combination of, the examples described below.

Example 1 includes a computing device for network power management, the computing device comprising: a power state manager to determine whether to trigger a network power down state; and a network power manager to (i) advertise an active-to-network-power-down transition state to a local network in response to a determination to trigger the network power down state, (ii) determine whether any peer device of the local network rejected or aborted the network power down state within a predetermined rejection time period in response to advertisement of the active-to-network-power-down transition state, (iii) advertise the network power down state to the local network in response to a determination that no peer device rejected or aborted the network power down state, (iv) determine whether any peer device of the local network rejected the network power down state within a predetermined propagation time period in response to advertisement of the network power down state, and (vi) enter the network power down state in response to a determination that no peer device rejected the network power down state.

Example 2 includes the subject matter of Example 1, and wherein to determine whether to trigger the network power down state comprises to: set a network inactivity timer, wherein the network inactivity timer is reset in response to incoming network activity; and determine whether the network inactivity has expired in response to setting the network inactivity timer.

Example 3 includes the subject matter of any of Examples 1 and 2, and wherein: to advertise the active-to-network-power-down transition state to the local network comprises to broadcast a first advertisement packet to the local network, wherein the first advertisement packet is indicative of the active-to-network-power-down transition state; and to advertise the network power down state to the local network comprises to broadcast a second advertisement packet to the local network, wherein the second advertisement packet is indicative of the network power down state.

Example 4 includes the subject matter of any of Examples 1-3, and wherein each of the first advertisement packet and the second advertisement packet comprises an Ethernet packet that includes a predetermined protocol type and a predetermined wake-up pattern.

Example 5 includes the subject matter of any of Examples 1-4, and wherein to determine whether any peer device of the local network rejected or aborted the network power down state within the predetermined rejection time period comprises to: start a network power down request rejection timer set to expire after the predetermined rejection time period; determine whether a network packet is received from a peer device in response to starting of the network power down request rejection timer, wherein the network packet comprises a network power management reject command packet or an ordinary data packet; and determine whether the network power down request rejection timer has expired.

Example 6 includes the subject matter of any of Examples 1-5, and wherein the determination that no peer device of the local network rejected or aborted the network power down state within the predetermined rejection time period comprises a determination that a network packet is not received from a peer device and a determination that the network power down request rejection timer has expired.

Example 7 includes the subject matter of any of Examples 1-6, and wherein to determine whether any peer device of the local network rejected the network power down state within the predetermined propagation time period comprises to: start a network power down state propagation timer set to expire after the predetermined propagation time period; determine whether a network power management reject command packet is received from a peer device in response to starting of the network power down state propagation timer; and determine whether the network power down state propagation timer has expired.

Example 8 includes the subject matter of any of Examples 1-7, and wherein the determination that no peer device of the local network rejected the network power down state within the predetermined propagation time period comprises a determination that a network power management reject command packet is not received from a peer device and a determination that the network power down state propagation timer has expired.

Example 9 includes the subject matter of any of Examples 1-8, and wherein: the network power manager is further to (i) operate a network interface of the computing device in a full-power state; and (ii) power down the network interface in response to the determination that no peer device rejected the network power down state; to determine whether to trigger the network power down state comprises to determine whether to trigger the network power down state in response operation of the network interface in the full-power state; and to enter the network power down state further comprises to enter the network power down state in response to powering down of the network interface.

Example 10 includes the subject matter of any of Examples 1-9, and wherein the network power manager is further to remain in an active state in response to a determination that any peer device of the local network rejected or aborted the network power down state within the predetermined rejection time period in response to advertisement of the active-to-network-power-down transition state.

Example 11 includes the subject matter of any of Examples 1-10, and wherein the network power manager is further to (i) wait a predetermined residence time period in response to a determination that any peer device of the local network rejected the network power down state within the predetermined propagation time period, wherein the predetermined residence time period is a minimum amount of time required to be resident in the network power down state, (ii) advertise an active state to the local network in response to waiting of the predetermined residence time period, and (iii) remain in the active state in response to advertisement of the active state.

Example 12 includes the subject matter of any of Examples 1-11, and wherein the network power manager is further to (i) determine whether to enter an active state in response to an entrance of the network power down state, (ii) advertise the active state to the local network in response to a determination to enter the active state, and (iii) enter the active state in response to advertisement of the active state.

Example 13 includes the subject matter of any of Examples 1-12, and wherein to determine whether to enter the active state comprises to: receive a network power management packet from the local network, wherein the network power management packet includes a predetermined protocol type and a predetermined wake-up pattern; and determine whether the network power management packet comprises a wake-up command.

Example 14 includes the subject matter of any of Examples 1-13, and wherein the determination to enter the active state comprises a determination that the network power management packet comprises the wake-up command.

Example 15 includes the subject matter of any of Examples 1-14, and wherein to determine whether to enter the active state further comprises to: determine whether the network power management packet comprises an advertisement packet, wherein the advertisement packet is indicative of a source computing device and a network power state of the source computing device; update a power state data table of the computing device based on the source computing device and the network power state indicated by the advertisement packet in response to a determination that the network power management packet comprises the advertisement packet; and remain in the network power down state in response to an update of the power state data table.

Example 16 includes the subject matter of any of Examples 1-15, and wherein the computing device comprises a network interface controller and the network interface controller comprises the network power manager.

Example 17 includes the subject matter of any of Examples 1-16, and further comprising a communication manager to: receive, during operation in an active state, an incoming network packet from a source computing device of the local network; determine whether the incoming network packet comprises a network power management packet, wherein the network power management packet includes a predetermined protocol type and a predetermined wake-up pattern; determine whether the network power management packet comprises an advertisement packet that is indicative of the active-to-network-power-down transition state in response to a determination that the incoming network packet comprises the network power management packet; determine whether the computing device is in active communication with the source computing device in response to a determination that the network power management packet comprises the advertisement packet; and send a network power down reject command packet to the source computing device in response to a determination that the computing device is in active communication with the source computing device, wherein the network power down reject command packet is a network power management packet that includes the predetermined protocol type and the predetermined wake-up pattern.

Example 18 includes the subject matter of any of Examples 1-17, and wherein the communication manager is further to: determine whether the network power management packet comprises an advertisement packet that is indicative of a network power state selected from the active state or the network power down state in response to the determination that the incoming network packet comprises the network power management packet; and update a power state data table of the computing device based on the source computing device and the network power state indicated by the advertisement packet in response to a determination that the network power management packet comprises the advertisement packet that is indicative of a network power state.

Example 19 includes the subject matter of any of Examples 1-18, and further comprising a communication manager to: determine, during operation in an active state, whether a destination computing device is in the network power down state based on a power state data table of the computing device; send a wake-up command packet to the destination computing device in response to a determination that the destination computing device is in the network power down state, wherein the wake-up command packet includes a includes a predetermined protocol type and a predetermined wake-up pattern; and send a data packet to the destination computing device in response to sending of the wake-up command packet.

Example 20 includes the subject matter of any of Examples 1-19, and wherein the computing device comprises a network interface controller and the network interface controller comprises the network power manager.

Example 21 includes a method for network power management, the method comprising: determining, by a computing device, whether to trigger a network power down state; advertising, by the computing device, an active-to-network-power-down transition state to a local network in response to determining to trigger the network power down state; determining, by the computing device, whether any peer device of the local network rejected or aborted the network power down state within a predetermined rejection time period in response to advertising the active-to-network-power-down transition state; advertising, by the computing device, the network power down state to the local network in response to determining that no peer device rejected or aborted the network power down state; determining, by the computing device, whether any peer device of the local network rejected the network power down state within a predetermined propagation time period in response to advertising the network power down state; and entering, by the computing device, the network power down state in response to determining that no peer device rejected the network power down state.

Example 22 includes the subject matter of Example 21, and wherein determining whether to trigger the network power down state comprises: setting a network inactivity timer, wherein the network inactivity timer is reset in response to incoming network activity; and determining whether the network inactivity has expired in response to setting the network inactivity timer.

Example 23 includes the subject matter of any of Examples 21 and 22, and wherein: advertising the active-to-network-power-down transition state to the local network comprises broadcasting a first advertisement packet to the local network, wherein the first advertisement packet is indicative of the active-to-network-power-down transition state; and advertising the network power down state to the local network comprises broadcasting a second advertisement packet to the local network, wherein the second advertisement packet is indicative of the network power down state.

Example 24 includes the subject matter of any of Examples 21-23, and wherein each of the first advertisement packet and the second advertisement packet comprises an Ethernet packet that includes a predetermined protocol type and a predetermined wake-up pattern.

Example 25 includes the subject matter of any of Examples 21-24, and wherein determining whether any peer device of the local network rejected or aborted the network power down state within the predetermined rejection time period comprises: starting a network power down request rejection timer set to expire after the predetermined rejection time period; determining whether a network packet is received from a peer device in response to starting the network power down request rejection timer, wherein the network packet comprises a network power management reject command packet or an ordinary data packet; and determining whether the network power down request rejection timer has expired.

Example 26 includes the subject matter of any of Examples 21-25, and wherein determining that no peer device of the local network rejected or aborted the network power down state within the predetermined rejection time period comprises determining that a network packet is not received from a peer device and that the network power down request rejection timer has expired.

Example 27 includes the subject matter of any of Examples 21-26, and wherein determining whether any peer device of the local network rejected the network power down state within the predetermined propagation time period comprises: starting a network power down state propagation timer set to expire after the predetermined propagation time period; determining whether a network power management reject command packet is received from a peer device in response to starting the network power down state propagation timer; and determining whether the network power down state propagation timer has expired.

Example 28 includes the subject matter of any of Examples 21-27, and wherein determining that no peer device of the local network rejected the network power down state within the predetermined propagation time period comprises determining that a network power management reject command packet is not received from a peer device and that the network power down state propagation timer has expired.

Example 29 includes the subject matter of any of Examples 21-28, and further comprising: operating, by the computing device, a network interface of the computing device in a full-power state; and powering down, by the computing device, the network interface in response to determining that no peer device rejected the network power down state; wherein determining whether to trigger the network power down state comprises determining whether to trigger the network power down state in response to operating the network interface in the full-power state; and wherein entering the network power down state further comprises entering the network power down state in response to powering down the network interface.

Example 30 includes the subject matter of any of Examples 21-29, and further comprising remaining, by the computing device, in an active state in response to determining that any peer device of the local network rejected or aborted the network power down state within the predetermined rejection time period in response to advertising the active-to-network-power-down transition state.

Example 31 includes the subject matter of any of Examples 21-30, and further comprising: waiting, by the computing device, a predetermined residence time period in response to determining that any peer device of the local network rejected the network power down state within the predetermined propagation time period, wherein the predetermined residence time period is a minimum amount of time required to be resident in the network power down state; advertising, by the computing device, an active state to the local network in response to waiting the predetermined residence time period; and remaining, by the computing device, in the active state in response to advertising the active state.

Example 32 includes the subject matter of any of Examples 21-31, and further comprising: determining, by the computing device, whether to enter an active state in response to entering the network power down state; advertising, by the computing device, the active state to the local network in response to determining to enter the active state; and entering, by the computing device, the active state in response to advertising the active state.

Example 33 includes the subject matter of any of Examples 21-32, and wherein determining whether to enter the active state comprises: receiving a network power management packet from the local network, wherein the network power management packet includes a predetermined protocol type and a predetermined wake-up pattern; and determining whether the network power management packet comprises a wake-up command.

Example 34 includes the subject matter of any of Examples 21-33, and wherein determining to enter the active state comprises determining that the network power management packet comprises the wake-up command.

Example 35 includes the subject matter of any of Examples 21-34, and wherein determining whether to enter the active state further comprises: determining whether the network power management packet comprises an advertisement packet, wherein the advertisement packet is indicative of a source computing device and a network power state of the source computing device; updating a power state data table of the computing device based on the source computing device and the network power state indicated by the advertisement packet in response to determining that the network power management packet comprises the advertisement packet; and remaining in the network power down state in response to updating the power state data table.

Example 36 includes the subject matter of any of Examples 21-35, and wherein: determining whether to enter the active state comprises determining whether to enter the active state by a network interface controller of the computing device; and advertising the active state to the local network comprises advertising the active state by the network interface controller.

Example 37 includes the subject matter of any of Examples 21-36, and further comprising: receiving, by the computing device while operating in an active state, an incoming network packet from a source computing device of the local network; determining, by the computing device, whether the incoming network packet comprises a network power management packet, wherein the network power management packet includes a predetermined protocol type and a predetermined wake-up pattern; determining, by the computing device, whether the network power management packet comprises an advertisement packet that is indicative of the active-to-network-power-down transition state in response to determining that the incoming network packet comprises the network power management packet; determining, by the computing device, whether the computing device is in active communication with the source computing device in response to determining that the network power management packet comprises the advertisement packet; and sending, by the computing device, a network power down reject command packet to the source computing device in response to determining that the computing device is in active communication with the source computing device, wherein the network power down reject command packet is a network power management packet that includes the predetermined protocol type and the predetermined wake-up pattern.

Example 38 includes the subject matter of any of Examples 21-37, and further comprising: determining, by the computing device, whether the network power management packet comprises an advertisement packet that is indicative of a network power state selected from the active state or the network power down state in response to determining that the incoming network packet comprises the network power management packet; and updating a power state data table of the computing device based on the source computing device and the network power state indicated by the advertisement packet in response to determining that the network power management packet comprises the advertisement packet that is indicative of a network power state.

Example 39 includes the subject matter of any of Examples 21-38, and further comprising: determining, by the computing device while operating in an active state, whether a destination computing device is in the network power down state based on a power state data table of the computing device; sending, by the computing device, a wake-up command packet to the destination computing device in response to determining that the destination computing device is in the network power down state, wherein the wake-up command packet includes a includes a predetermined protocol type and a predetermined wake-up pattern; and sending, by the computing device, a data packet to the destination computing device in response to sending the wake-up command packet.

Example 40 includes the subject matter of any of Examples 21-39, and wherein: advertising the active-to-network-power-down transition state to the local network comprises advertising the active-to-network-power-down transition state by a network interface controller of the computing device; determining whether any peer device of the local network rejected or aborted the network power down state within the predetermined rejection time period comprises determining whether any peer device of the local network rejected or aborted the network power down state by the network interface controller; advertising the network power down state to the local network comprises advertising the network power down state by the network interface controller; and determining whether any peer device of the local network rejected the network power down state within the predetermined propagation time period comprises determining whether any peer device of the local network rejected the network power down state by the network interface controller.

Example 41 includes a computing device comprising: a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for network power management, the computing device comprising: means for determining whether to trigger a network power down state; means for advertising an active-to-network-power-down transition state to a local network in response to determining to trigger the network power down state; means for determining whether any peer device of the local network rejected or aborted the network power down state within a predetermined rejection time period in response to advertising the active-to-network-power-down transition state; means for advertising the network power down state to the local network in response to determining that no peer device rejected or aborted the network power down state; means for determining whether any peer device of the local network rejected the network power down state within a predetermined propagation time period in response to advertising the network power down state; and means for entering the network power down state in response to determining that no peer device rejected the network power down state.

Example 45 includes the subject matter of Example 44, and wherein the means for determining whether to trigger the network power down state comprises: means for setting a network inactivity timer, wherein the network inactivity timer is reset in response to incoming network activity; and means for determining whether the network inactivity has expired in response to setting the network inactivity timer.

Example 46 includes the subject matter of any of Examples 44 and 45, and wherein: the means for advertising the active-to-network-power-down transition state to the local network comprises broadcasting a first advertisement packet to the local network, wherein the first advertisement packet is indicative of the active-to-network-power-down transition state; and means for advertising the network power down state to the local network comprises broadcasting a second advertisement packet to the local network, wherein the second advertisement packet is indicative of the network power down state.

Example 47 includes the subject matter of any of Examples 44-46, and wherein each of the first advertisement packet and the second advertisement packet comprises an Ethernet packet that includes a predetermined protocol type and a predetermined wake-up pattern.

Example 48 includes the subject matter of any of Examples 44-47, and wherein the means for determining whether any peer device of the local network rejected or aborted the network power down state within the predetermined rejection time period comprises: means for starting a network power down request rejection timer set to expire after the predetermined rejection time period; means for determining whether a network packet is received from a peer device in response to starting the network power down request rejection timer, wherein the network packet comprises a network power management reject command packet or an ordinary data packet; and means for determining whether the network power down request rejection timer has expired.

Example 49 includes the subject matter of any of Examples 44-48, and wherein the means for determining that no peer device of the local network rejected or aborted the network power down state within the predetermined rejection time period comprises means for determining that a network packet is not received from a peer device and that the network power down request rejection timer has expired.

Example 50 includes the subject matter of any of Examples 44-49, and wherein the means for determining whether any peer device of the local network rejected the network power down state within the predetermined propagation time period comprises: means for starting a network power down state propagation timer set to expire after the predetermined propagation time period; means for determining whether a network power management reject command packet is received from a peer device in response to starting the network power down state propagation timer; and means for determining whether the network power down state propagation timer has expired.

Example 51 includes the subject matter of any of Examples 44-50, and wherein the means for determining that no peer device of the local network rejected the network power down state within the predetermined propagation time period comprises means for determining that a network power management reject command packet is not received from a peer device and that the network power down state propagation timer has expired.

Example 52 includes the subject matter of any of Examples 44-51, and further comprising: means for operating a network interface of the computing device in a full-power state; and means for powering down the network interface in response to determining that no peer device rejected the network power down state; wherein the means for determining whether to trigger the network power down state comprises means for determining whether to trigger the network power down state in response to operating the network interface in the full-power state; and wherein the means for entering the network power down state further comprises means for entering the network power down state in response to powering down the network interface.

Example 53 includes the subject matter of any of Examples 44-52, and further comprising means for remaining in an active state in response to determining that any peer device of the local network rejected or aborted the network power down state within the predetermined rejection time period in response to advertising the active-to-network-power-down transition state.

Example 54 includes the subject matter of any of Examples 44-53, and further comprising: means for waiting a predetermined residence time period in response to determining that any peer device of the local network rejected the network power down state within the predetermined propagation time period, wherein the predetermined residence time period is a minimum amount of time required to be resident in the network power down state; means for advertising an active state to the local network in response to waiting the predetermined residence time period; and means for remaining in the active state in response to advertising the active state.

Example 55 includes the subject matter of any of Examples 44-54, and further comprising: means for determining whether to enter an active state in response to entering the network power down state; means for advertising the active state to the local network in response to determining to enter the active state; and means for entering the active state in response to advertising the active state.

Example 56 includes the subject matter of any of Examples 44-55, and wherein the means for determining whether to enter the active state comprises: means for receiving a network power management packet from the local network, wherein the network power management packet includes a predetermined protocol type and a predetermined wake-up pattern; and means for determining whether the network power management packet comprises a wake-up command.

Example 57 includes the subject matter of any of Examples 44-56, and wherein the means for determining to enter the active state comprises means for determining that the network power management packet comprises the wake-up command.

Example 58 includes the subject matter of any of Examples 44-57, and wherein the means for determining whether to enter the active state further comprises: means for determining whether the network power management packet comprises an advertisement packet, wherein the advertisement packet is indicative of a source computing device and a network power state of the source computing device; means for updating a power state data table of the computing device based on the source computing device and the network power state indicated by the advertisement packet in response to determining that the network power management packet comprises the advertisement packet; and means for remaining in the network power down state in response to updating the power state data table.

Example 59 includes the subject matter of any of Examples 44-58, and wherein: the means for determining whether to enter the active state comprises means for determining whether to enter the active state by a network interface controller of the computing device; and the means for advertising the active state to the local network comprises means for advertising the active state by the network interface controller.

Example 60 includes the subject matter of any of Examples 44-59, and further comprising: means for receiving, by the computing device while operating in an active state, an incoming network packet from a source computing device of the local network; means for determining whether the incoming network packet comprises a network power management packet, wherein the network power management packet includes a predetermined protocol type and a predetermined wake-up pattern; means for determining whether the network power management packet comprises an advertisement packet that is indicative of the active-to-network-power-down transition state in response to determining that the incoming network packet comprises the network power management packet; means for determining whether the computing device is in active communication with the source computing device in response to determining that the network power management packet comprises the advertisement packet; and means for sending a network power down reject command packet to the source computing device in response to determining that the computing device is in active communication with the source computing device, wherein the network power down reject command packet is a network power management packet that includes the predetermined protocol type and the predetermined wake-up pattern.

Example 61 includes the subject matter of any of Examples 44-60, and further comprising: means for determining whether the network power management packet comprises an advertisement packet that is indicative of a network power state selected from the active state or the network power down state in response to determining that the incoming network packet comprises the network power management packet; and means for updating a power state data table of the computing device based on the source computing device and the network power state indicated by the advertisement packet in response to determining that the network power management packet comprises the advertisement packet that is indicative of a network power state.

Example 62 includes the subject matter of any of Examples 44-61, and further comprising: means for determining, by the computing device while operating in an active state, whether a destination computing device is in the network power down state based on a power state data table of the computing device; means for sending a wake-up command packet to the destination computing device in response to determining that the destination computing device is in the network power down state, wherein the wake-up command packet includes a includes a predetermined protocol type and a predetermined wake-up pattern; and means for sending a data packet to the destination computing device in response to sending the wake-up command packet.

Example 63 includes the subject matter of any of Examples 44-62, and wherein: the means for advertising the active-to-network-power-down transition state to the local network comprises means for advertising the active-to-network-power-down transition state by a network interface controller of the computing device; the means for determining whether any peer device of the local network rejected or aborted the network power down state within the predetermined rejection time period comprises means for determining whether any peer device of the local network rejected or aborted the network power down state by the network interface controller; the means for advertising the network power down state to the local network comprises means for advertising the network power down state by the network interface controller; and the means for determining whether any peer device of the local network rejected the network power down state within the predetermined propagation time period comprises means for determining whether any peer device of the local network rejected the network power down state by the network interface controller.

The invention claimed is:

1. A computing device for network power management, the computing device comprising:
   a power state manager to determine whether to trigger a network power down state; and
   a network power manager to (i) advertise an active-to-network-power-down transition state to a local network in response to a determination to trigger the network power down state, (ii) determine whether any peer device of the local network rejected or aborted the network power down state within a predetermined rejection time period in response to advertisement of the active-to-network-power-down transition state, (iii) advertise the network power down state to the local network in response to a determination that no peer device rejected or aborted the network power down state, (iv) determine whether any peer device of the local network rejected the network power down state within a predetermined propagation time period in response to advertisement of the network power down state, and (vi) enter the network power down state in response to a determination that no peer device rejected the network power down state.

2. The computing device of claim 1, wherein:
   to advertise the active-to-network-power-down transition state to the local network comprises to broadcast a first advertisement packet to the local network, wherein the first advertisement packet is indicative of the active-to-network-power-down transition state; and
   to advertise the network power down state to the local network comprises to broadcast a second advertisement packet to the local network, wherein the second advertisement packet is indicative of the network power down state.

3. The computing device of claim 2, wherein each of the first advertisement packet and the second advertisement packet comprises an Ethernet packet that includes a predetermined protocol type and a predetermined wake-up pattern.

4. The computing device of claim 1, wherein to determine whether any peer device of the local network rejected or aborted the network power down state within the predetermined rejection time period comprises to:

start a network power down request rejection timer set to expire after the predetermined rejection time period;
determine whether a network packet is received from a peer device in response to starting of the network power down request rejection timer, wherein the network packet comprises a network power management reject command packet or an ordinary data packet; and
determine whether the network power down request rejection timer has expired.

5. The computing device of claim 1, wherein to determine whether any peer device of the local network rejected the network power down state within the predetermined propagation time period comprises to:

start a network power down state propagation timer set to expire after the predetermined propagation time period;
determine whether a network power management reject command packet is received from a peer device in response to starting of the network power down state propagation timer; and
determine whether the network power down state propagation timer has expired.

6. The computing device of claim 1, wherein:

the network power manager is further to (i) operate a network interface of the computing device in a full-power state; and (ii) power down the network interface in response to the determination that no peer device rejected the network power down state;
to determine whether to trigger the network power down state comprises to determine whether to trigger the network power down state in response operation of the network interface in the full-power state; and
to enter the network power down state further comprises to enter the network power down state in response to powering down of the network interface.

7. The computing device of claim 1, wherein the network power manager is further to (i) wait a predetermined residence time period in response to a determination that any peer device of the local network rejected the network power down state within the predetermined propagation time period, wherein the predetermined residence time period is a minimum amount of time required to be resident in the network power down state, (ii) advertise an active state to the local network in response to waiting of the predetermined residence time period, and (iii) remain in the active state in response to advertisement of the active state.

8. The computing device of claim 1, wherein the network power manager is further to (i) determine whether to enter an active state in response to an entrance of the network power down state, (ii) advertise the active state to the local network in response to a determination to enter the active state, and (iii) enter the active state in response to advertisement of the active state.

9. The computing device of claim 8, wherein to determine whether to enter the active state comprises to:

receive a network power management packet from the local network, wherein the network power management packet includes a predetermined protocol type and a predetermined wake-up pattern; and
determine whether the network power management packet comprises a wake-up command.

10. The computing device of claim 9, wherein to determine whether to enter the active state further comprises to:

determine whether the network power management packet comprises an advertisement packet, wherein the advertisement packet is indicative of a source computing device and a network power state of the source computing device;
update a power state data table of the computing device based on the source computing device and the network power state indicated by the advertisement packet in response to a determination that the network power management packet comprises the advertisement packet; and
remain in the network power down state in response to an update of the power state data table.

11. The computing device of claim 1, further comprising a communication manager to:

receive, during operation in an active state, an incoming network packet from a source computing device of the local network;
determine whether the incoming network packet comprises a network power management packet, wherein the network power management packet includes a predetermined protocol type and a predetermined wake-up pattern;
determine whether the network power management packet comprises an advertisement packet that is indicative of the active-to-network-power-down transition state in response to a determination that the incoming network packet comprises the network power management packet;
determine whether the computing device is in active communication with the source computing device in response to a determination that the network power management packet comprises the advertisement packet; and
send a network power down reject command packet to the source computing device in response to a determination that the computing device is in active communication with the source computing device, wherein the network power down reject command packet is a network power management packet that includes the predetermined protocol type and the predetermined wake-up pattern.

12. The computing device of claim 1, further comprising a communication manager to:

determine, during operation in an active state, whether a destination computing device is in the network power down state based on a power state data table of the computing device;
send a wake-up command packet to the destination computing device in response to a determination that the destination computing device is in the network power down state, wherein the wake-up command packet includes a includes a predetermined protocol type and a predetermined wake-up pattern; and
send a data packet to the destination computing device in response to sending of the wake-up command packet.

13. The computing device of claim 1, wherein the computing device comprises a network interface controller and the network interface controller comprises the network power manager.

14. A method for network power management, the method comprising:

determining, by a computing device, whether to trigger a network power down state;
advertising, by the computing device, an active-to-network-power-down transition state to a local network in response to determining to trigger the network power down state;
determining, by the computing device, whether any peer device of the local network rejected or aborted the network power down state within a predetermined rejection time period in response to advertising the active-to-network-power-down transition state;

advertising, by the computing device, the network power down state to the local network in response to determining that no peer device rejected or aborted the network power down state;
determining, by the computing device, whether any peer device of the local network rejected the network power down state within a predetermined propagation time period in response to advertising the network power down state; and
entering, by the computing device, the network power down state in response to determining that no peer device rejected the network power down state.

15. The method of claim 14, wherein:
advertising the active-to-network-power-down transition state to the local network comprises broadcasting a first advertisement packet to the local network, wherein the first advertisement packet is indicative of the active-to-network-power-down transition state; and
advertising the network power down state to the local network comprises broadcasting a second advertisement packet to the local network, wherein the second advertisement packet is indicative of the network power down state.

16. The method of claim 14, wherein determining whether any peer device of the local network rejected or aborted the network power down state within the predetermined rejection time period comprises:
starting a network power down request rejection timer set to expire after the predetermined rejection time period;
determining whether a network packet is received from a peer device in response to starting the network power down request rejection timer, wherein the network packet comprises a network power management reject command packet or an ordinary data packet; and
determining whether the network power down request rejection timer has expired.

17. The method of claim 14, wherein determining whether any peer device of the local network rejected the network power down state within the predetermined propagation time period comprises:
starting a network power down state propagation timer set to expire after the predetermined propagation time period;
determining whether a network power management reject command packet is received from a peer device in response to starting the network power down state propagation timer; and
determining whether the network power down state propagation timer has expired.

18. The method of claim 14, further comprising:
waiting, by the computing device, a predetermined residence time period in response to determining that any peer device of the local network rejected the network power down state within the predetermined propagation time period, wherein the predetermined residence time period is a minimum amount of time required to be resident in the network power down state;
advertising, by the computing device, an active state to the local network in response to waiting the predetermined residence time period; and
remaining, by the computing device, in the active state in response to advertising the active state.

19. The method of claim 14, further comprising:
determining, by the computing device, whether to enter an active state in response to entering the network power down state;
advertising, by the computing device, the active state to the local network in response to determining to enter the active state; and
entering, by the computing device, the active state in response to advertising the active state.

20. One or more non-transitory, computer-readable storage media comprising a plurality of instructions that in response to being executed cause a computing device to:
determine whether to trigger a network power down state;
advertise an active-to-network-power-down transition state to a local network in response to determining to trigger the network power down state;
determine whether any peer device of the local network rejected or aborted the network power down state within a predetermined rejection time period in response to advertising the active-to-network-power-down transition state;
advertise the network power down state to the local network in response to determining that no peer device rejected or aborted the network power down state;
determine whether any peer device of the local network rejected the network power down state within a predetermined propagation time period in response to advertising the network power down state; and
enter the network power down state in response to determining that no peer device rejected the network power down state.

21. The one or more non-transitory, computer-readable storage media of claim 20, wherein:
to advertise the active-to-network-power-down transition state to the local network comprises to broadcast a first advertisement packet to the local network, wherein the first advertisement packet is indicative of the active-to-network-power-down transition state; and
to advertise the network power down state to the local network comprises to broadcast a second advertisement packet to the local network, wherein the second advertisement packet is indicative of the network power down state.

22. The one or more non-transitory, computer-readable storage media of claim 20, wherein to determine whether any peer device of the local network rejected or aborted the network power down state within the predetermined rejection time period comprises to:
start a network power down request rejection timer set to expire after the predetermined rejection time period;
determine whether a network packet is received from a peer device in response to starting the network power down request rejection timer, wherein the network packet comprises a network power management reject command packet or an ordinary data packet; and
determine whether the network power down request rejection timer has expired.

23. The one or more non-transitory, computer-readable storage media of claim 20, wherein to determine whether any peer device of the local network rejected the network power down state within the predetermined propagation time period comprises to:
start a network power down state propagation timer set to expire after the predetermined propagation time period;
determine whether a network power management reject command packet is received from a peer device in response to starting the network power down state propagation timer; and
determine whether the network power down state propagation timer has expired.

24. The one or more non-transitory, computer-readable storage media of claim 20, further comprising a plurality of instructions that in response to being executed cause the computing device to:
- wait a predetermined residence time period in response to determining that any peer device of the local network rejected the network power down state within the predetermined propagation time period, wherein the predetermined residence time period is a minimum amount of time required to be resident in the network power down state;
- advertise an active state to the local network in response to waiting the predetermined residence time period; and
- remain in the active state in response to advertising the active state.

25. The one or more non-transitory, computer-readable storage media of claim 20, further comprising a plurality of instructions that in response to being executed cause the computing device to:
- determine whether to enter an active state in response to entering the network power down state;
- advertise the active state to the local network in response to determining to enter the active state; and
- enter the active state in response to advertising the active state.

* * * * *